Figure 3:
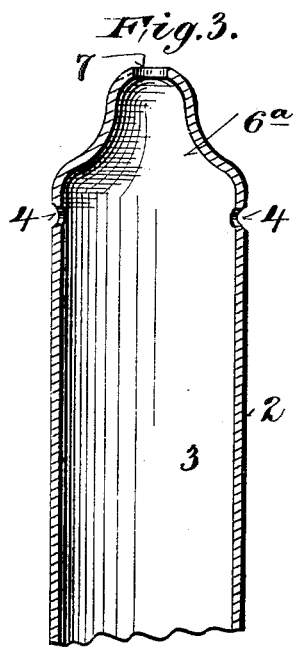

No. 679,458. Patented July 30, 1901.
A. W. HARRINGTON.
TUBULAR BELL FOR CHIMING CLOCKS.
(Application filed Jan. 24, 1901.)
(No Model.) 2 Sheets—Sheet 1.
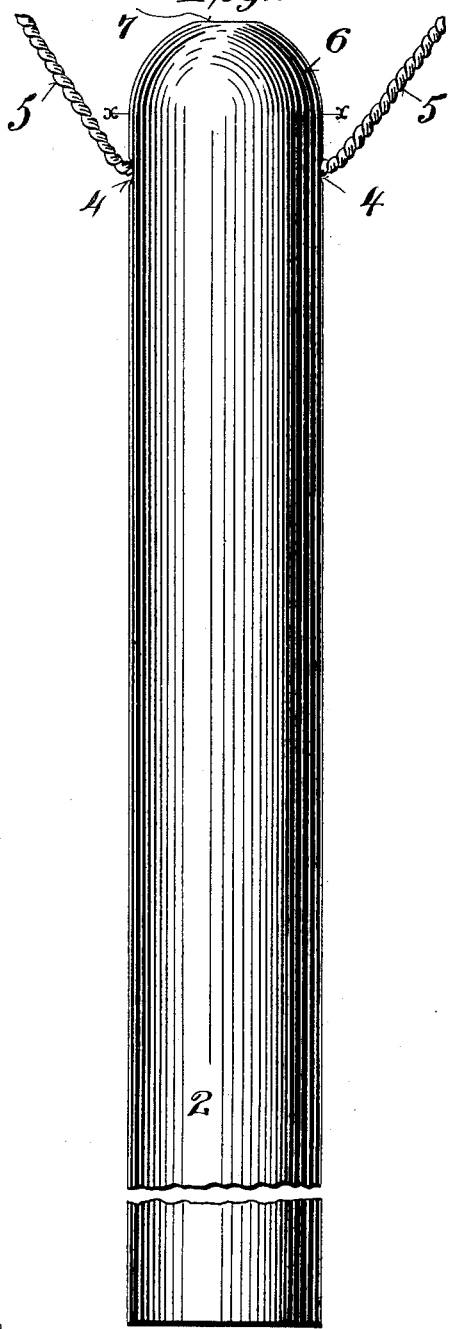
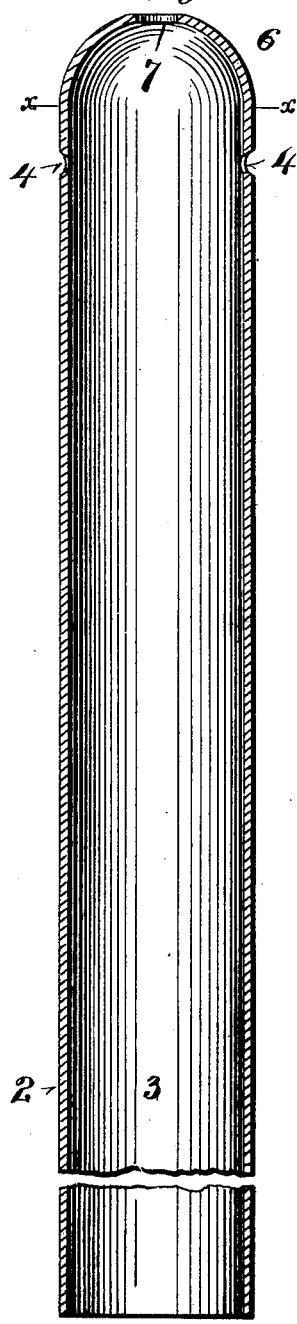
Witnesses
C. W. Benjamin
Chas. G. Hensley
Inventor
Allen Wardner Harrington
by Joseph L. Levy
atty No. 679,458. Patented July 30, 1901.
A. W. HARRINGTON.
TUBULAR BELL FOR CHIMING CLOCKS.
(Application filed Jan. 24, 1901.)

(No Model.) 2 Sheets—Sheet 2.

Witnesses,
C. W. Benjamin
Chas. G. Hensley

Inventor:
Allen Wardner Harrington
by Joseph L. Levy
atty

UNITED STATES PATENT OFFICE.

ALLEN WARDNER HARRINGTON, OF NEW YORK, N. Y., ASSIGNOR TO HARRIS & HARRINGTON, OF SAME PLACE.

TUBULAR BELL FOR CHIMING CLOCKS.

SPECIFICATION forming part of Letters Patent No. 679,458, dated July 30, 1901.

Application filed January 24, 1901. Serial No. 44,509. (No model.)

*To all whom it may concern:*

Be it known that I, ALLEN WARDNER HARRINGTON, a citizen of the United States, residing at the city of New York, (Flushing,) county of Queens, and State of New York, have invented certain new and useful Improvements in Tubular Bells for Chiming Clocks, of which the following is a specification.

My invention relates to a new and useful tubular bell designed for use in chiming clocks, and has for its object the production of a tube or bell of the class described which shall give superior results both musically and mechanically.

To the accomplishment of this object and such others as may hereinafter appear the invention consists in a tubular bell devoid of all foreign or added stiffening devices or weights which tend to impair more or less the action and usefulness of the bell, but having an extension thereon preferably integral and of gradually-reduced diameter which enables it to emit a clear and sonorous note of great purity, volume, and steadiness, and which by preference the tube and extension are both homogeneous and integral.

The invention further consists in the novel construction and combination of parts hereinafter fully described, and particularly pointed out in the claims, reference being had to the accompanying drawings, forming part hereof, in which the same characters of reference indicate like parts throughout the several views, and in which—

Figure 1 is a side elevation of a tubular bell in accordance with the preferred form of my invention. Fig. 2 is a longitudinal sectional elevation of the same; and Figs. 3, 4, 5, 6, 7, and 8 are similar views of the upper portion of tubes, showing modified forms of my invention.

In the figures, 2 designates the body of the tube of cylindrical and conventional construction having a longitudinal bore 3 open at the ends, except as hereinafter specified, the tube being provided with an aperture 4 in its wall for the passage of a preferably non-metallic supporting device 5, Fig. 1, all in the usual or desired way. The point of impact of the striking-hammer is adjacent the upper end of the tube above the point of support, which is approximately at the line $x$ $x$, and preferably just above said line.

In order to avoid the employment of all foreign or added stiffening means for the tube, which occupy the center of the tube or traverse its bore, and thus hinder free venting of the tone, or which transversely connect the walls of the tube by means traversing the bore of the tube at the center and which are applied at right angles or otherwise to the tube, and therefore impair more or less the purity and volume of tone and its freedom of venting, and which in being thrust into the tube and pressing against the walls thereof may through expansion and contraction, or carelessness on the part of workmen, press the tube out of a true round form and seriously affect its tone, or which if secured by solder introduces a foreign and non-resonant substance, or if by other mechanical or other intermediate connections adds different characters of metal involving variations in tonal quality, expansion and contraction, or looseness of parts, and where such added device of stiffeners both traverse the bore of the tube and build it out beyond its ascertained or determined length for a given tone or increase the thickness of the metal of the tube, and which devices, no matter how skilfully applied, are still foreign devices or substances introduced into and around the tube, affecting deleteriously the purity and senority of the tone—that is to say, to avoid these disadvantageous results, cheapen the cost, and produce a far superior article I produce an extension 6 thereon of gradually-reduced diameter, as shown. In the preferred form, as shown in Figs. 1 and 2, this extension 6 is made in the form of a true hemisphere, its arch springing from the line $x$ $x$, and it is formed on, integral with, and a homogeneous part of the tube 3 preferably by spinning the material of the tube over properly-shaped dies or cores, as indicated, a small aperture 7 being preferably left as the center thereof for the proper venting of the tube. This aperture may be varied to suit particular conditions; but I have found that with the tube of one and three-eighths-inch bore, six feet three and one-half inches in length, and thickness of wall three sixty-fourths of an inch, said aperture may be one-quarter of an inch and that the height of the arch or extension of the tube is preferably eleven-sixteenths of an inch, and that the distance between the top of the tube and its point of support may be about two inches, although all of these dimensions may be varied within ascertained limitations. The construction results in reducing a tube to its simplest form, stripped of all auxiliaries and additions, and thereby increasing the purity of tone. Its homogeneity through its entire length and entire absence of joints, angles, or interposing substances enables it to emit a clear and sonorous note of great volume and steadiness. The absence of solder or soldering acids, &c., prevents possible "creeping" at future times, due to chemical or other causes, which often necessitates the removal of the tubes from its mechanism and cleansing anew or repairing, and the danger of the loosening of joints made by solder or otherwise is entirely avoided.

While the form shown in Figs. 1 and 2 is deemed preferable, the gradually-reduced end of the tube may be of other forms and still obtain superior results.

Figure 4:
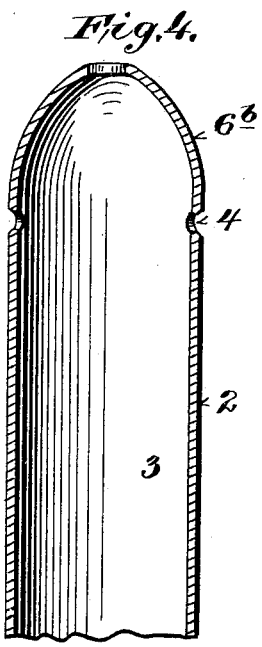
Figure 5:
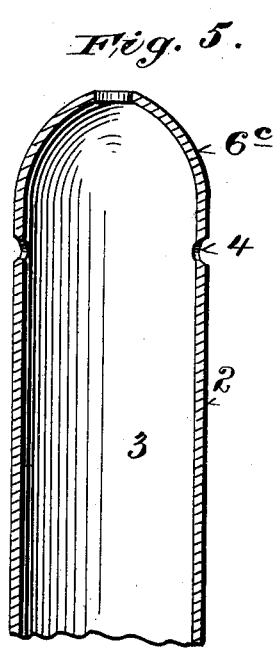
Figure 6:
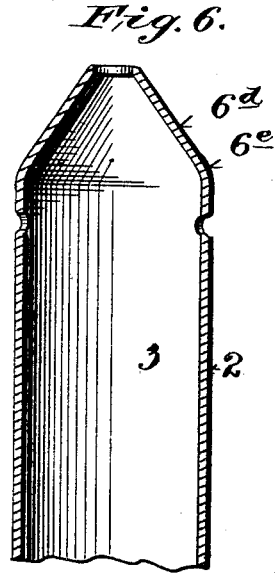
Figure 7:
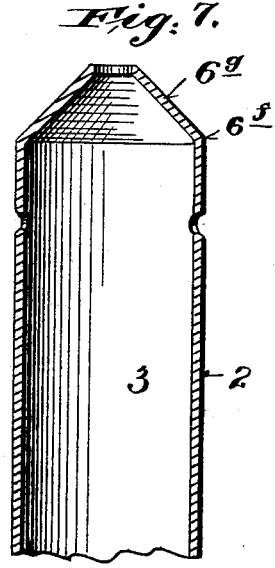

Some other forms are indicated in the remaining figures of the drawings, that in Fig. 3, 6$^a$, being irregular or of a reverse curve in cross-section; in Fig. 4, 6$^b$, being elliptical in cross-section, and in Fig. 5, 6$^c$, of similar cross-section, but of less length or height. In Fig. 6 the end 6$^d$ is conical, with a curved base 6$^e$, where it merges into the tube instead of the angular union 6$^f$ of the end 6$^g$, as shown in Fig. 7. These can be "spun" or otherwise produced, as in the preferred example. In all these constructions the outside diameter of the tube is not increased, but is left clean and clear, whereby all clumsiness of construction of the appurtenances or a reduced diameter of tube is avoided, a desideratum in this class of device, since the largest diameter of tube that can be practically used gives best results.

Figure 8:
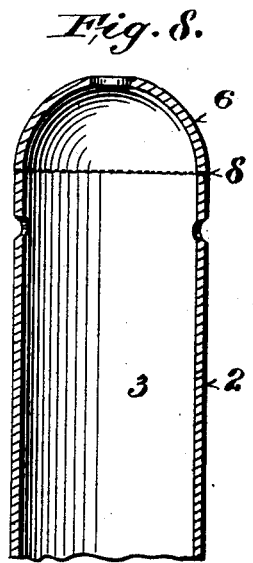

As indicated in Fig. 8 at 8, the reduced ends 6 may be spun or struck up separately in the form of a cap of the desired form (which may also include any of the preceding examples) and then soldered to the tube, care being taken as by roughening the opposing surface to produce a firm and molecular union. As this form is in a measure open to some of the previously-stated objections, I do not consider it as good as the integrally-formed end, which latter is preferred. If soldering is used, it is preferred that the manner of producing a molecular union as recited in my Patent No. 656,603, dated August 31, 1900, be employed. Of course this modification is applicable to any of the shapes of the ends. The tubes, it will be understood, may be of varying size and thickness, as deemed suitable. I do not think that my invention will be avoided by thickening the ends 6 at any point, and therefore include this modification as coming within this scope of my invention; but I do not believe that the results will be as satisfactory as in an end of even thickness with the body of the tube.

While the invention has been described with reference to the details of construction, I do not wish it to be limited thereto, as I desire to include all such modifications, changes, and alterations as fairly fall within the spirit and scope thereof.

What I claim is—

1. In a musical sounding apparatus of the class described, a tube adapted to be struck by a hammer and thereby caused to vibrate to produce a musical sound of a certain pitch, and having an extension from its annular end of gradually-reduced diameter, and lateral suspending apertures below and adjacent said end.

2. A tubular bell having an extension from its annular end of gradually-reduced diameter, and an aperture in the apex of said end.

3. A tubular bell having an extension from its annular end of gradually-reduced diameter, an aperture in the apex of said end, and lateral alining apertures below and adjacent the said end.

4. A tubular bell having an extension from its annular end, integral therewith, and of gradually-reduced diameter, and lateral suspending apertures below and adjacent the initial point of reduction of said end.

5. A tubular bell having an extension therefrom of gradually-reduced diameter, and provided with an aperture in its center.

6. A tubular bell having an integral extension therefrom of gradually-reduced diameter and provided with an aperture in its center.

7. A tubular bell having a hemispherical end, and lateral apertures below said end.

8. A tubular bell provided with an apertured hemispherical end, and lateral alining apertures adjacent to and below said end.

9. A tubular bell having an integral and apertured hemispherical end.

10. A bell for chiming clocks, comprising a continuously-cylindrical tube of greater length than width, in which the metal of the tube at one end is formed into a projection of gradually-reduced diameter and laterally-alined apertures in the tube adjacent and below said reduced end.

11. A bell for chiming clocks, comprising a continuously-cylindrical tube of greater length than width, in which the metal of the tube at one end is formed into a projection of gradually-reduced diameter, said projection having an aperture at its extreme point.

12. A tubular bell having an end spun into a hemisphere and having an aperture in the extreme end of the hemispherical extension.

13. A tubular bell having an end spun into a hemisphere having an aperture in the extreme end of the hemispherical extension, and lateral alining apertures below and adjacent to said end.

Signed in the city, county, and State of New York this 23d day of January, 1901.

ALLEN WARDNER HARRINGTON.

Witnesses:
　CHAS. G. HENSLEY,
　SOPHIE SEKSKY.